United States Patent [19]
Depenheuer

[11] 3,741,611
[45] June 26, 1973

[54] PRESSURE MEDIUM CONTROL ARRANGEMENT FOR AN ANTISKID SYSTEM

[75] Inventor: Otto Depenheuer, Bad Homburg, Germany

[73] Assignee: ITT Industries, Inc., New York, N.Y.

[22] Filed: Apr. 27, 1972

[21] Appl. No.: 248,072

[52] U.S. Cl. .............................. 303/21 F, 188/182
[51] Int. Cl. ............................................. B60t 8/06
[58] Field of Search ..................... 303/21 F, 10, 61; 188/1 A, 182

[56] References Cited
UNITED STATES PATENTS

| | | | |
|---|---|---|---|
| 3,682,514 | 8/1972 | Oberthur | 303/21 F |
| 3,606,488 | 9/1971 | Beuchle et al. | 303/21 F |
| 3,682,513 | 8/1972 | Oberthur | 303/21 F |
| 3,614,055 | 10/1971 | Douglas | 303/21 F |

Primary Examiner—Allen N. Knowles
Attorney—C. Cornell Remsen, Jr., Menotti J. Lombardi, Jr. et al.

[57] ABSTRACT

The pressure medium control arrangement for an antiskid system disclosed herein disposes a piston directly and movably in the brake line between the master cylinder and the wheel brake cylinder. In this manner the brake line connected to the master cylinder and the brake line connected to the wheel brake cylinder are separated from each other. One transverse surface of the piston is applied with pressure built up in the master cylinder upon braking. A shoulder on the piston is applied with pressure from an accumulator in the opposite direction in response to an incipient skid signal. Movement of the piston by accumulator pressure back towards the master cylinder input expands the volume of the brake line connected to the wheel brake cylinder and also pumps pressure medium back into the master cylinder. Heavy return springs and a pressure medium pump to return the pressure medium to the master cylinder are eliminated by the arrangement disclosed herein.

9 Claims, 1 Drawing Figure

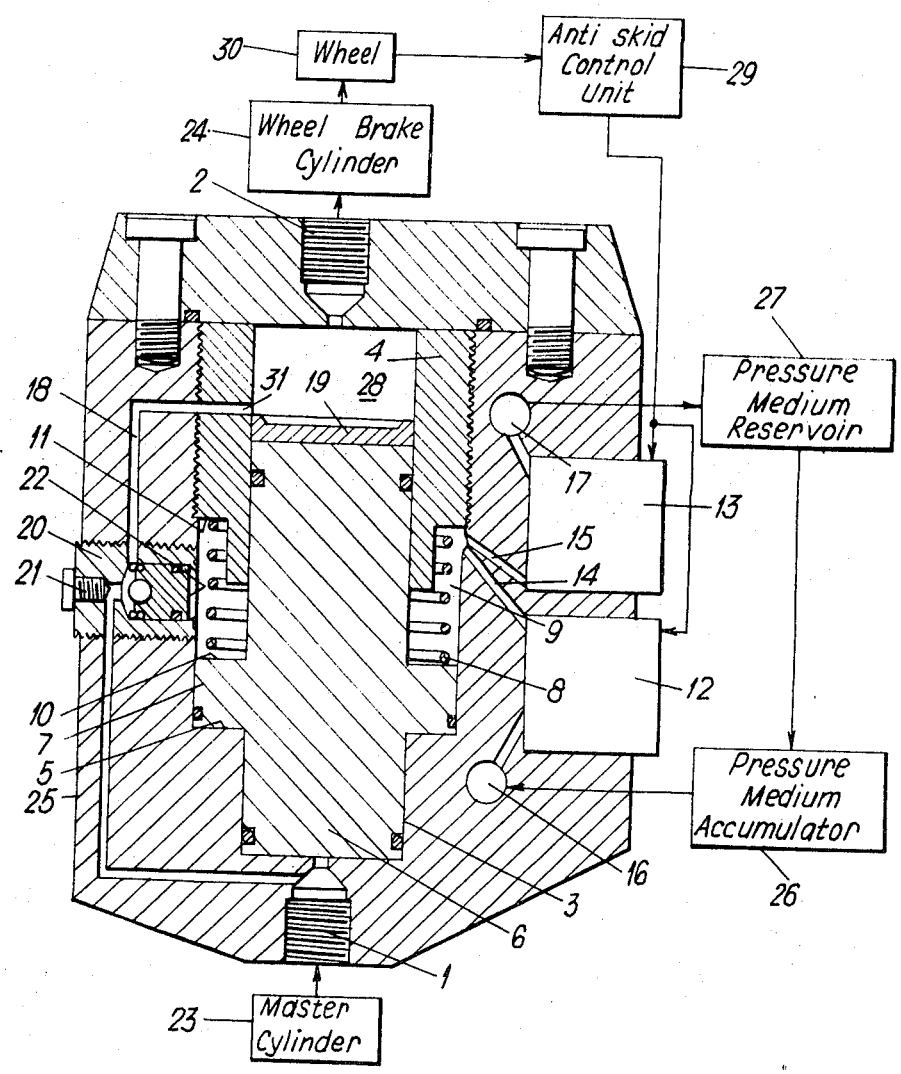

PRESSURE MEDIUM CONTROL ARRANGEMENT FOR AN ANTISKID SYSTEM

BACKGROUND OF THE INVENTION

The invention relates to an antiskid system for motor vehicles provided with static brake circuits and more particularly with a piston movable between two extreme positions dependent on a control value for the purpose of influencing the brake pressure in the wheel brake cylinder during a braking operation.

In all antiskid systems of this type, see for instance, German Pat. DOS 1,755,617 and U.S. Pat. Nos. 3,433,535 and 3,540,780, known up to now a shut-off element is provided in the hydraulic connection line between the master cylinder and the wheel brake cylinder while a branch is provided in that section of said connection line connected with the wheel brake cylinder. A controllable plunger unit is connected to said branch. The movement of this plunger within its cylinder as well as the above-mentioned shut-off element are controllable through special hydraulic and mechanic means dependent on the control value, such as for instance, the deceleration of the vehicular wheel. If after the beginning of the braking operation the deceleration of the wheel surpasses a permissible limit, that is, if the brake pressure in the wheel brake cylinder is too high, the shut-off element in the brake line will interrupt the hydraulic connection between the master cylinder and the wheel brake cylinder and the plunger will be moved by known means such as to increase the volume of that section of the brake line which is connected with the wheel brake cylinder, the pressure medium thus being caused to expand. Thereby the wheel's deceleration will be reduced and the wheel will re-accelerate. At a point of this deceleration and re-acceleration operation selected as favorable for an optimum braking, the plunger will be returned into its initial position and the interruption of the hydraulic connection between the master cylinder and the wheel brake cylinder will be removed so that a new deceleration of the wheel is brought about.

The plunger units provided in the branch of the brake line require considerable space and also need a strong return spring which in the last phase of the control cycle will return the plunger into its initial position. In the first phase of the control cycle a sufficient control force must be supplied to act against this return spring. This control force may be of a mechanical nature, or the control force may be provided by gaseous pressure. Therefore, a strong accumulator pressure must be provided. On the other hand, the return force of the return spring must withstand the highest brake pressure possible.

SUMMARY OF THE INVENTION

It is the object of the present invention to provide a system of the type referred to above which is free from such disadvantages, which is space-saving and which is not expensive.

A feature of the present invention is the provision of a pressure medium control arrangement for an antiskid system comprising: at least one wheel brake cylinder; a first brake line section connected to the wheel cylinder; a master cylinder; a second brake line section connected to the master cylinder; a pressure medium accumulator; an antiskid control unit; and a piston movably disposed in series with respect to the first and second brake line sections, the piston sealably separating the first and second brake line sections, a first surface of the piston disposed adjacent the second brake line section being applied with pressure from the master cylinder upon braking to move the piston toward the first brake line section for actuation of the wheel cylinder, and a second surface of the piston disposed intermediate the first and second brake line sections being applied with pressure from the accumulator in response to an incipient skid condition detected by the control unit to move the piston toward the second brake line section for relieving braking pressure in the wheel cylinder and to return pressure medium to the master cylinder.

Another feature of the present invention is the provision of a pressure medium control arrangement as defined in the paragraph immediately above and further comprising a body having a longitudinal bore therein, a first member to close one end of the bore and a second member to close the other end of the bore, the first member having a first longitudinal passage therethrough to provide communication between the second brake line section and the one end of the bore, the second member having a second longitudinal passage therethrough to provide communication between the first brake line section and the other end of the bore, and the bore including a first portion adjacent the one end of the bore having a first diameter, a second portion adjacent the other end of the bore having a second diameter greater than the first diameter and a first transverse surface interconnecting the first and second portions; and a hollow sleeve threaded into the second portion adjacent the other end of the bore, the inner diameter of the sleeve having a value equal to the first diameter, the sleeve having a second transverse surface at the end of the sleeve extending into the bore toward but spaced from the first transverse surface, a third transverse surface intermediate the ends of the sleeve and a longitudinal surface interconnecting the second and third transverse surfaces; and wherein the piston includes third and fourth portions having the first diameter interconnected by an annular radial projection having the second diameter, the third portion being slidably sealed to the first portion and normally filling the first portion, the fourth portion being slidably sealed to the sleeve, the end of the fourth portion, the inner surface of the second member and the inner surface of the second portion forming a first chamber, the projection slidably sealed to the second portion with one transverse surface thereof being normally seated against the first transverse surface, the first surface of the piston being the transverse surface thereof normally seated against the first member, and the second surface of the piston being the other transverse surface of the projection spaced from the second transverse surface.

A further feature of the present invention is the provision of a pressure medium control arrangement as defined in the paragraph immediately above and further including a second chamber being defined by the inner surface of the bore, the other transverse surface of the projection, the outer surface of the fourth portion, the second transverse surface and the third transverse surface; a helical spring encircling the fourth portion supported by the other transverse surface of the projection and the third transverse surface; a normally closed input valve disposed in the body and passageways disposed in the body connecting the accumulator to the annular chamber; a pressure medium reservoir; and a normally opened output valve disposed in the body and passageways disposed in the body connecting the reservoir to the annular chamber.

The input valve and the output valve are controlled by signals corresponding to the state of motion prevailing at the wheel.

The above defined first chamber and first longitudinal passage are connected with each other by an expansion bore which is blocked by means of a normally open pressure-medium-operated seat valve.

The pressure medium actuating surface of the seat valve is located in the above defined annular or second chamber.

The orifice of the expansion bore in the above defined first chamber is blocked by a collar secured to the end of the above defined fourth portion when the piston leaves its rest position.

A venting screw is provided transversely through the body in cooperating association of the seat valve.

BRIEF DESCRIPTION OF THE DRAWING

The above-mentioned and other features and objects of this invention and the manner of obtaining them will become more apparent by reference to the following description taken in conjunction with the drawing, the single FIGURE of which is a longitudinal cross-sectional view of the antiskid pressure medium control arrangement in accordance with the principles of the present invention in cooperative relation with other components of an antiskid system.

DESCRIPTION OF THE PREFERRED EMBODIMENT

The pressure medium control arrangement illustrated in the FIGURE is connected in the brake line directly connected between the master cylinder 23 and the wheel brake cylinder 24. The connection to the master cylinder is by means of longitudinal passage 1 and the connection to the wheel brake cylinder is by means of longitudinal passage 2. These two passages 1 and 2 are connected with each other in the housing or body 25 of the arrangement by means of a stepped longitudinal cylinder bore 3. In the part of bore 3 adjacent passage 2 a sleeve 4 is threaded in the wall of body 25. The thickness sleeve 4 is such that its inner diameter is equal to the inner diameter of step 5 of bore 3.

Piston 6 is slidably sealed to the inner surface of bore 3 and sleeve 4. At the circumference of piston 6 a shoulder or projection 7 is provided which corresponds to step 5 of bore 3. A spring 8 is disposed in annular chamber 9 formed between bore 3, shoulder 7, sleeve 4 and piston 6. On the one hand, spring 8 is supported on the annular surface 10 of shoulder 7. On the other hand, spring 8 is supported by a step 11 of sleeve 4. Spring 8 keeps the piston 6 in its rest position, namely, in abutment with step 5 and the bottom of bore 3 adjacent passage 1 as illustrated. In corresponding recesses of housing 25 an input solenoid actuated valve 12 and an output solenoid actuated valve 13 are disposed. From each of the two valves 12 and 13 pressure medium connection bores or passageways 14 and 15 leads into annular chamber 9. In addition, a connection line or passageway 16 is connected from input valve 12 to an accumulator 26 while a connection line or passageway 17 is connected from output valve 13 to a reservoir 27.

For the purpose of achieving a pressure compensation between the two brake line sections separated from each other by piston 6 and connected respectively to the master cylinder and the wheel brake cylinder, an expansion bore 18 is provided in housing 25 of the inventive arrangement. Expansion bore 18 forms a bypass between passage 1 connected to master cylinder 23 and the first chamber 28 situated before piston 6. In the rest position of the arrangement the orifice of bore 18 in chamber 28 is before piston 6 and, hence, open.

The orifice 31 of expansion bore 18 in chamber 28 is designed such as to be immediately slid over and blocked (closed) by a collar 19 secured to the end of piston 6 when piston 6 is controlled to move out of its rest position. Within expansion bore 18 a normally opened seat valve 20 provided with a venting screw 21 is disposed. Seat valve 20 is operated by pressure medium. Its actuation surface 22 is contained in annular chamber 9. If pressure is built up in annular chamber 9 during a control cycle as will be described below, this pressure will press seat valve 20 onto its seat and interrupt the bypass of expansion bore 18.

The working of the system is as follows:

In the rest position of the arrangement, output valve 13 is opened so that annular chamber 9 communicates with reservoir 27 via output valve 13 and connection line 17 and is free from pressure medium pressure. Piston 6 is held in the rest position illustrated by means of the force of spring 8 disposed in annular chamber 9.

If the driver starts a braking operation which proceeds from the master cylinder, piston 6 will be displaced against the force of spring 8 by means of the pressure built up in the brake line section connected with master cylinder 23. Because of this movement of piston 6 — as a result of which collar 19 slides over orifice 31 of expansion bore 18 and blocks the same — the pressure actuated by the driver is transmitted to the brake line section connected with wheel brake cylinder 24 and the brakes are applied.

If the respective wheel tends to lock due to a brake pressure which is excessive in view of the existing friction conditions between the road surface and the wheel contact surface an antiskid control unit 29 will generate an actuation signal for both input valve 12 and output valve 13, said signal being generated in dependence on the state of motion of wheel 30 which is detected by a sensor disposed at the wheel. Thus, both valves 12 and 13 will be brought into their switched positions, that is, output valve 13 will close and separate annular chamber 9 from reservoir 27 and input valve 12 will open and connect annular chamber 9 with accumulator 26 via connection line 16. Thus, the pressure of accumulator 26 will enter annular chamber 9 and apply pressure to annular surface 10 of shoulder 7 for the duration that the input valve 12 is opened, said duration also being determined by the state of motion of wheel 30. Thereby piston 6 — in correspondence with the opening period of input valve 12 — will be displaced in the direction toward its initial position against the brake pressure generated by the driver. By this movement the pressure in the brake line section connected to wheel brake cylinder 24 is expanded as a result of the ensuing volume expansion while at the same time pressure medium is pumped from the brake line section connected with the master cylinder and passage 1 back into master cylinder 23. The pressure, which upon the opening of input valve 12 enters annular chamber 9, will act on actuation surface 22 of seat valve 20 and closed the latter so as to interrupt the by-pass of expansion bore 18 to prevent any pressure compensation between the two brake line sections from taking place during the control cycles. Because of the reduction of the pressure in wheel brake cylinder 24, wheel 30 will regain speed and input valve 12 will be closed again by a control signal generated as soon as a predetermined state of motion of the wheel is achieved. The latter control signal likewise is generated by control unit 29 when the danger of wheel locking has passed. Now the pressure in the brake line section connected with wheel brake cylinder 24 can be held constant for a certain period by means of keeping output valve 13 closed for this period; or the pressure may be immediately increased, possibly in a throttled manner, by means of opening output valve 13 so that the pressure prevailing in annular chamber 9 will expand into reservoir 27 and, due to the new movement of piston 6, the pressure generated by the driver will be again built up in wheel brake cylinder 24.

The advantages of the present invention especially are the space-and-cost-saving design. In a surprisingly effective manner the present invention combines the advantageous characteristics of two basic systems for influencing the brake pressure. Due to the arrangement of the plunger in the brake line, the reduction of the brake pressure is achieved by means of volume expansion during one control cycle. However, there arises no need to provide additional space for the excessive pressure medium, but rather the pressure medium is pumped back into the master cylinder by means of the piston movement. As compared with the systems known up to now which work according to the principle of volume expansion, the invention has the decisive advantage of being considerably smaller in size. Mechanical or hydraulic-pneumatic return springs prestressed with a great force can be dispensed with. There are greater possibilities of integrating this system into an existing brake system.

In comparison with the known systems which pump the excessive pressure medium back into the master cylinder, the invention is characterized in that no return pump is needed as the pressure medium is not actually drawn out of the brake circuit but rather is displaced.

While I have described above the principles of my invention in connection with specific apparatus it is to be clearly understood that this description is made only by way of example and not as a limitation to the scope of my invention as set forth in the objects thereof and in the accompanying claims.

I claim:

1. A pressure medium control arrangement for an antiskid system comprising:

at least one wheel brake cylinder;

a first brake line section connected to said wheel cylinder;

a master cylinder;

a second brake line section connected to said master cylinder;

a pressure medium accumulator;

an antiskid control unit;

a piston movably disposed in series with respect to said first and second brake line sections, said piston sealably separating said first and second brake line sections, a first surface of said piston disposed adjacent said second brake line section being applied with pressure from said master cylinder upon braking to move said piston toward said first brake line section for actuation of said wheel cylinder, and a second surface of said piston disposed intermediate said first and second brake line sections being applied with pressure from said accumulator in response to an incipient skid condition detected by said control unit to move said piston toward said second brake line section for relieving braking pressure in said wheel cylinder and to return pressure medium to said master cylinder; and a body having a longitudinal bore therein, a first member to close one end of said bore and a second member to close the other end of said bore, said first member having a first longitudinal passage therethrough to provide communication between said second brake line section and said one end of said bore, said second member having a second longitudinal passage therethrough to provide communication between said first brake line section and said other end of said bore, and said bore including a first portion adjacent said one end of said bore having a first diameter, a second portion adjacent said other end of said bore having a second diameter greater than said first diameter and a first transverse surface interconnecting said first and second portions; and a hollow sleeve threaded into said second portion adjacent said other end of said bore, the inner diameter of said sleeve having a value equal to said first diameter, said sleeve having a second transverse surface at the end of said sleeve extending into said bore toward but spaced from said first transverse surface, a third transverse surface intermediate the ends of said sleeve and a longitudinal surface interconnecting said second and third transverse surfaces; and wherein said piston includes third and fourth portions having said first diameter interconnected by an annular radial projection having said second diameter, said third portion being slidably sealed to said first portion and normally filling said first portion, said fourth portion being slidably sealed to said sleeve, the end of said fourth portion, the inner surface of said second member and the inner surface of said second portion forming a first chamber, said projection slidably sealed to said second portion with one transverse surface thereof being normally seated against said first transverse surface, said first surface of said piston being the transverse surface thereof normally seated against said first member, and said second surface of said piston being the other transverse surface of said projection spaced from said second transverse surface.

2. An arrangement according to claim 1, further including a second chamber being defined by the inner surface of said bore, said other transverse surface of said projection, the outer surface of said fourth portion, said second transverse surface and said third transverse surface;

a helical spring encircling said fourth portion supported by said other transverse surface of said projection and said third transverse surface;

a normally closed input valve disposed in said body and passageways disposed in said body connecting said accumulator to said annular chamber;

a pressure medium reservoir; and a normally opened output valve disposed in said body and passageways disposed in said body connecting said reservoir to said annular chamber.

3. An arrangement according to claim 2, wherein said input and output valves are controlled by said control unit.

4. An arrangement according to claim 2, wherein said input and output valves are both solenoid operated valves; and said control unit is an electronic control unit producing electric control signals to control said input and output valves.

5. An arrangement according to claim 2, further including an expansion bore disposed in said body interconnecting said first chamber and said first longitudinal passage; and a normally open pressure medium operated seat valve disposed in said expansion bore.

6. An arrangement according to claim 5, wherein the pressure medium actuating surface of said seat valve is disposed in said second chamber.

7. An arrangement according to claim 6, wherein the orifice of said expansion bore in said first chamber is blocked by a collar secured to the end of said fourth portion as soon as said piston is moved from said first member toward said second member.

8. An arrangement according to claim 5, wherein the orifice of said expansion bore in said first chamber is blocked by said fourth portion as soon as said piston is moved from said first member toward said second member.

9. An arrangement according to claim 5, further including a venting screw extending transversely through said body in cooperative association with said seat valve.

* * * * *